Dec. 8, 1959 C. E. RICKARD 2,916,306
PIPE IN SOCKET COUPLING HAVING LOOSE THREAD CONNECTING MEANS
Filed Jan. 11, 1957

INVENTOR.
Clyde E. Rickard
BY Green, McCallister & Miller
HIS ATTORNEYS

# United States Patent Office 2,916,306
Patented Dec. 8, 1959

2,916,306

PIPE IN SOCKET COUPLING HAVING LOOSE THREAD CONNECTING MEANS

Clyde E. Rickard, Pittsburgh, Pa., assignor to McDowell Manufacturing Company, Millvale, Pa., a corporation of Pennsylvania Application January 11, 1957, Serial No. 633,719

1 Claim. (Cl. 285—5)

This invention pertains to a deflection coupling and particularly, to a collar-type of quick-release coupling.

A phase of the invention deals with an effective, self-sealing, easily-assembled and disassembled coupling suitable for a fluid-carrying pipe line system.

There has been a need for an improved coupling assembly in a system such as used in carrying petroleum products, mine slurries, etc. Such a coupling should have advantages of a permanent type, without either its disadvantages or the disadvantages of a temporary type (such as used for a highly portable system).

In a pipe or conduit system having a pair of branches or sides defining a joint, it is oftentimes difficult and bothersome to move one side of considerable length or span longitudinally or rotatably with respect to the other side. This may be incident to the separation and assembly of a pair of pipe or conduit end portions. I have found that it is important to provide for assembly and disassembly of a coupled relationship without the need for turning adjoining pipe or conduit members with respect to each other, and without the need for separating them axially or longitudinally to fully free them from each other.

It has been an object of my invention to provide an improved quick-release, mechanical-interlock type of coupling.

Another object has been to devise a solution to the problem of assembling and disassembling coupled pipe end portions without the necessity for turning the pipe members relative to each other or for extensive axial or longitudinal movement of them with respect to each other.

A further object of my invention has been to devise a coupling construction which makes effective employment of a three-part assembly of mechanical parts or utilize a nut collar for effecting an assembly and disassembly of the construction.

A still further object of my invention has been to devise a simple, efficient, and easily-manipulated coupling constructed that will be practical for sealing-off fluid that is used under a wide range of unit pressures.

These and other objects of my invention will appear to those skilled in the art from the illustrated embodiment and the claim.

Figure 1:
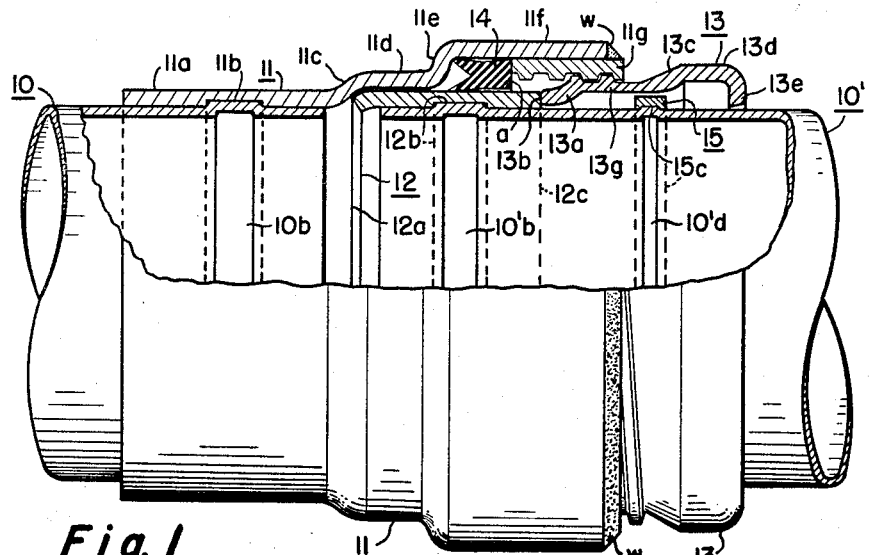
Figure 1 is a longitudinal side view in elevation and broken-out section showing a coupling construction of my invention in a fully assembled relationship.
Figure 2:
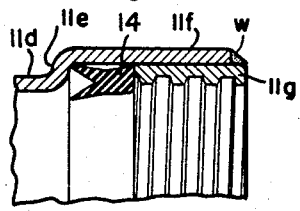
Figure 2 is a side fragment of structure of and on the scale of Figure 1; it is taken through a portion of a coupling housing body member and illustrates the positioned relationship of a sealing gasket before the insertion of a nose body member.

Referring particularly to Figures 1 and 2, I have disclosed a quick-release coupling of a self-sealing and mechanical-interlocking or latching type. The coupling comprises a housing body part or member 11, a telescoping or interfitting nose body part or insert member 12, and a nut collar, body or sleeve part 13. I also show an annular gasket 14 of resilient, elastic-like material, such as of rubber or a rubber-like plastic.

The housing body 11 is shown as having a back end or mounting portion 11a. The mounting portion 11a has a telescopic or sleeve fitting over and in close abutment upon a forward end portion of pipe or conduit member 10. The forward end portion of the pipe member 10 is to be coupled to the forward end portion of an adjacent or adjoining pipe or conduit member 10'. The mounting portion 11a is shown provided with an inner annular groove portion 11b within which is received a rolled-out band or tongue portion 10b of the conduit. This provides a secure tongue and groove mounting, although welding, brazing, cementing and other methods may be employed, depending on the nature of the materials, the relative thicknesses of the parts, their strength and other characteristics.

The coupling nose body or insert part 12 is of cylindrical or annular shape and fits as a sleeve over the forward end portion of the other conduit 10' and has a radially-inwardly-turned or forwardly-beveled entry edge 12a. The entry edge 12a facilitates the introduction and removal of the nose part 12 from within the housing part 11, minimizes damage due to any tendency for the nose and housing parts to jam with respect to each other, provides an inner stop limit for maximum screw-in or tightening-up of the coupling parts with respect to each other (see Figure 1) and also importantly, facilitates a deflection separation and assembly of the parts 11 and 12 with respect to each other (see Figure 6).

In addition to mounting area abutment by reason of its tight telescopic fit, the nose part 12 is shown as having an inner annular groove portion 12b that receives or interlocks with an outwardly-projecting annular band portion 10'b of the associated conduit member 10'.

The housing body part 11, forwardly-longitudinally of the mounting portion 11a, projects radially-outwardly as effected by a shoulder portion 11c, a cylindrical or annular shelf portion 11d, a second shoulder portion 11e, and an outer cylindrical or annular shelf portion 11f. As shown particularly in Figure 1, the entry edge portion 12a of the nose 12 has a radial-inward convex curvature or bevel which corresponds to or is complementary with a radial-outward concave (inside) curvature or bevel of the shoulder portion 11c. The shoulder portion 11c thus serves as a stop or limit shoulder for the entry end portion 12a of the nose part.

The first cylindrical or annular portion 11d is in close adjacency with the cylindrical operating surface of the nose part 12, so as to define a transversely or radially-bounding and slide-supporting area for the nose part 12 within the housing part 11 when the construction is in a coupled relationship. A forwardly-inwardly spaced banding support is thus given to the nose part 12 when the coupling is assembled by screwing-in the collar body part 13. This provides one pair of a set of longitudinally-spaced pairs of supporting-cooperating portions between the members or parts of the coupling. The other pair of the set is provided by interlatching or threaded portions 11g and 13g of body members 11 and 13.

Figure 4:
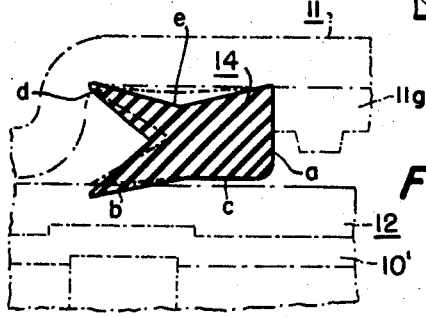
Figure 4 is a side sectional fragment on an intermediate scale between Figures 1 and 3 and particularly disclosing the pre-shape or the form of annular gasket employed in the coupling construction of Figures 1 and 2.
Figure 5:
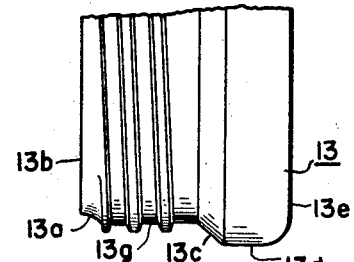
Figure 5 is a fragmental side view in elevation of the construction of and on the scale of Figures 1 and 2, showing an outer view of a collar member employed.

The shoulder 11e, as well as an adjacent back portion of the second cylindrical portion 11f, define a retainer recess or pocket for the operative-mounting and elastically-distorted positioning of the resilient annular gasket 14. As seen particularly by comparing Figures 1, 2 and 4, the gasket 14 has somewhat of a double U-shape. One somewhat shallow U-shaped portion e serves as an outer side wall which may be distorted under an application of an extremely high, positive fluid pressure into substantially full abutment against the inner portion of the wall of 11f; this portion provides a flow chamber or space for the gasket 14 when it is moved into position within the pocket. That is, the gasket 14 is elastically mounted in or squeezed into its pocket to give it a retaining pressure of a minimum of about 1/16 of a pound per square inch. It is thus held in an operative position to provide a fluid seal or prevent fluid leakage under minimum pressure applications.

The body of the gasket is of somewhat rectangular cross-section. The shape of outer side wall portion e is important in providing the gasket with a better sealing action by reason of its highly positively-retained mounted position within its pocket. The shape of e is also important in combination with the radially-outwardly offset or beveled shape of inner side wall portion c.

The forward or front portion of the outer or second cylindrical portion 11f of the housing body 11 integrally carries on its inner wall a relatively wide-clearance, internal, latching or female thread portion 11g. The portion 11g may, as shown, be separately formed and provided with a tight slide fit within the portion 11f, and be permanently secured by weld bead w. The back edge or end of the internally-threaded portion 11g also aids in defining the socket, recess or pocket portion within which the gasket 14 is mounted, as it abuts a base or front end wall portion a of the gasket 14. Thus, the back edge of 11g provides an abutment face for the gasket-receiving pocket.

An inner side wing portion b of the gasket 14 is connected to the base portion a by the radially-inner and slightly-outwardly-offset side wall portion c. Inner side wing portion b of the gasket 14 cooperates with an opposed, outer side wing portion d to define a backwardly-open, widened and a forwardly-closed-off, positive-fluid-pressure-sensitive expansion chamber. As shown in Figure 1, the chamber is open endwise-backwardly to the spacing or passageway defined by a joint between by the cylindrical nose body 12 and the first offset cylindrical portion 11d of the housing body 11. The fluid-pressure-sensitive end chamber thus provides one U-shape of the gasket, while the outer face of side wall portion e provides the other U-shape thereof.

As will be seen particularly from Figure 1, the sealing face of the outer side wall portion e of the gasket 14 may be elastically moved or advanced from its forward and back ends into seating abutment with the inner face of the housing wall portion 11f. The gasket 14 is elastically-distorted into its mounted positions; compare its free shape of Figure 4 with its pocket-mounted position of Figure 2 and with its sealing or fully operatively-mounted position of Figure 1. The positioning of Figure 1 is attained when the gasket 14 has been further elastically-distorted (along its wing portion b) by the introduction of the nose part 12. Extremely high fluid pressures tend to close the face of e towards its center or mid point into full lengthwise abutment with the housing wall portion 11f. I prefer to provide the inner wing portion b with an elastic pressure contact on the nose 12 of a minimum of about 1/8 of a pound per square inch.

The collar body part or sleeve assembling member 13 is rotatably-loosely mounted or positioned over the forward end portion of the pipe or conduit member 10' and is prevented from sliding backwardly away from a conveniently-adjacent, usable position for coupling and uncoupling operations, by a radially-outwardly-projecting annulus or retainer ring 15. The ring 15 (see Figure 1) has an inner, annular, slot or groove portion 15c into which is expanded a band portion 10'd of the conduit. Thus, a third tongue and groove arrangement is employed for mounting purposes.

The collar body 13 has a forwardly-inwardly-sloped or declining annular shoulder portion 13a that terminates forwardly in a push-abutment edge or end 13b and backwardly, in an intermediate shelf portion 13g. The portion 13g is provided with male threads to interlatch or interlock with the inner or female threads 11g of the housing body 11.

Towards its extreme back end, the collar 13 converges or slopes concavely-backwardly from the portion 13g to define a front connecting shoulder portion 13c. When the collar 13 is forwardly-advanced to screw it in or tighten it down, its front edge portion 13b abuts back edge 12c of the nose part to hold the latter part securely in under-abutment with the portions 11c and 11d of the housing member 11.

The shoulder portion 13c slightly converges backwardly-radially-outwardly or is cone-shaped outwardly into an outer shelf or annular back wall portion 13d. The wall 13d terminates in an in-turned back end flange portion 13e. The portion 13d thus serves as a manual turn-grip for the collar 13 which may, if desired, be provided with spanner wrench openings, a wrench flat, or a knurled surface for the purpose of facilitating screwing it into and out of the housing body member or part 11.

The in-turned or radially-inwardly-projecting back flange portion 13e serves as a barrier to the entry of stones, mud, etc., into the spacing between the inner wall of the collar 13 and the outer cylindrical wall of the conduit 10'. It also serves as a back limit stop for relative forward movement of the collar body 13 with respect to retainer ring 15. It will be noted that the forwardly-inwardly-projecting shoulder 13a of the front end portion of the collar 13 provides a front limit stop for backward movement of the collar 15, by reason of the abutment of its under-surface with the ring 15. By this means, I provide a relatively loose, rotatable-slide type of retention of the collar part 13 in a suitable convenient operating position on the end portion of the conduit 10'. It will be noted that the conduit 10 is, in effect, a part of the housing body member 11 and that the conduit 10' is, in effect, a part of the nose or insert body member 12. Thus, the coupling body member 13 is, in effect, operatively positioned or mounted with respect to or on the member 12.

Figure 3:
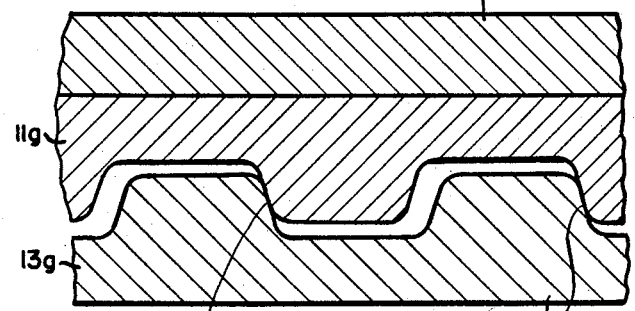
Figure 3 is a greatly enlarged side sectional fragment, illustrating interlatching thread portions of the coupling of Figure 1 and disclosing the relatively wide clearance relationship therebetween.

In Figure 3, I have illustrated the relatively loose or wide clearance between the thread portions 11g and 13g. As disclosed, the clearance spacing thus provides a minimum or localized contact area between the threads 11g and 13g, as exemplified by the vertical or radial wall g. Thus, the shape and the pitch of the threads makes it very easy to line them up without cross-threading or galling and to screw them in and out with a minimum of effort. A so-called acme-type of thread is disclosed, although any other suitable, wide-pitch type with a suitable looseness of fitting may be utilized.

Figure 6:
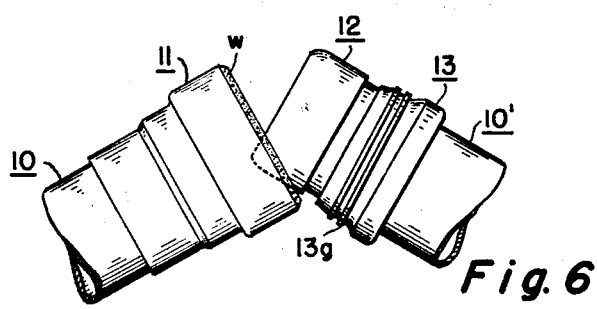
Figure 6 is a greatly reduced, somewhat diagrammatic side view showing how adjoining ends of pipe members employing a coupling of my invention may be deflected transversely to separate them.

Figure 6 is a diagrammatic view showing how the body parts 11 and 12 may be deflected at the coupling joint as to their longitudinal axes to assemble and disassemble them without moving one of the conduit members 10 and 10' axially or longitudinally of the system. This is further assured by means of the wide threading of the latching portions 11g and 13g.

I have determined that a construction made in accordance with my invention wil lstand up under pressures of from 0 to 1,000 pounds per square inch. It is automatically and effectively self-sealing under pressure applications. A full screw-down or screw-up of the collar coupling body member 13 is not essential from the standpoint of an effective sealing-off of the fluid or liquid. The coupling body members 11 and 12 need only to be held in position sufficiently to prevent their separation, as long as the gasket 14 operatively seats and engages between the outer cylindrical sealing surface of the nose part 12 and the inner cylindrical sealing surface of the recess or pocket and particularly, of the wall portion 11f.

What I claim is:

An improved latch collar coupling construction for quickly-detachably connecting a pair of conduits by angularly deflecting the conduits along their longitudinal axes to provide an angular deflection coupling entrance and eliminate needless longitudinal movement between the conduits comprising, a pair of telescopic body members having radially-offset and longitudinally-spaced-apart pairs of cooperating support portions, one of said body members being mounted on an end of one of the conduits and the other body member being mounted on an adjacent end of the other conduit, said one body member being a cylindrical housing, said other body member being a cylindrical insertable nose member; said insertable nose member having a radially-inwardly curved front end portion, and a cylindrical portion projecting backwardly from said front end portion for engagement with said other conduit and terminating in a back edge abutment; said cylindrical housing comprising, a radially-inner cylindrical wall mounting portion at its back end for engagement with the one conduit, a first radially-outwardly curved offset shoulder at the forward end of said mounting portion forming a stop shoulder for limiting the maximum insertion of the front end portion of said nose member, a first offset cylindrical wall portion projecting forwardly from said first shoulder for housing a forward longitudinal section of the cylindrical portion of said nose member in close adjacency therewith to form one pair of the pairs of offset and spaced-apart cooperating support portions, a second radially-outwardly-projecting offset shoulder at the forward end of said first offset cylindrical wall portion of said cylindrical housing and having a second offset cylindrical wall portion projecting forwardly therefrom, and a relatively short-length wide-clearance female threaded portion secured on an inside front portion of the second offset cylindrical wall portion; a locking collar member mounted on the other conduit; retaining lug means on the other conduit for rotatably and slidably mounting said collar member thereon, said collar member comprising, a front edge portion adapted to abut against the back edge of the cylindrical portion of said nose member and advance it within said housing, a radially-outwardly-offset relatively short-length portion backwardly of said front edge portion provided with wide-clearance male threads substantially along its entire extent to form an interlatching joint with said female threaded portion and thus form a second and offset pair of the spaced-apart cooperating support portions, an outwardly offset gripping portion backwardly of said wide clearance male threads, having an inturned end portion adapted to slide on the other conduit, and an elongated radially-inwardly open recess formed between said front edge portion and said inturned end portion for housing said retaining lug means and permitting longitudinal movement of said collar with respect to said retaining lug means; a fluid-pressure-responsive resilient annular gasket having inner and outer wing portions; a gasket-receiving pocket defined by said second offset shoulder, a rear portion of said second offset cylindrical wall, a back edge of said female threaded portion of said housing, and a backward portion of the cylindrical portion of said insert nose member; said gasket being retained within said gasket-receiving pocket with the forward ends of said inner and outer wing portions facing toward said second radially-outwardly-projecting offset shoulder, said inner wing portion being sloped radially inwardly for operable sealing engagement with said nose member, said inner and outer wing portions being compressibly retained in contact with said body members with a pre-determined minimum pressure, and said second offset cylindrical wall portion of said housing being radially-offset from said insertable nose member, whereby said housing and said nose member may be angularly deflected at the coupling joint as to their longitudinal axes to facilitate coupling and uncoupling without unnecessary longitudinal movement therebetween.

References Cited in the file of this patent
UNITED STATES PATENTS

| | | |
|---|---|---|
| 827,739 | Lingenfelter | Aug. 7, 1906 |
| 1,853,411 | Gentry | Apr. 12, 1932 |
| 1,869,915 | Sample | Aug. 2, 1932 |
| 1,945,293 | Pierce | Jan. 30, 1934 |
| 2,148,036 | Pfefferle | Feb. 21, 1939 |
| 2,226,547 | Boynton | Dec. 31, 1940 |
| 2,272,812 | Neal | Feb. 10, 1942 |
| 2,757,966 | Samiran | Aug. 7, 1956 |
| 2,806,717 | Hempel | Sept. 17, 1957 |
| 2,809,853 | Nathan | Oct. 15, 1957 |